US006542873B1

(12) United States Patent
Goodwin, III et al.

(10) Patent No.: US 6,542,873 B1
(45) Date of Patent: *Apr. 1, 2003

(54) SYSTEM AND METHOD FOR USING AN ENHANCED EXTERNAL DATA INTERFACE TO DISPLAY DATA IN EPL SYSTEMS

(75) Inventors: John C. Goodwin, III, Suwanee, GA (US); Terry L. Zimmerman, Lawrenceville, GA (US)

(73) Assignee: NCR Corporation, Dayton, OH (US)

( * ) Notice: Subject to any disclaimer, the term of this patent is extended or adjusted under 35 U.S.C. 154(b) by 250 days.

This patent is subject to a terminal disclaimer.

(21) Appl. No.: 09/587,785

(22) Filed: Jun. 6, 2000

(51) Int. Cl.[7] ................ G06F 17/60; G06K 15/00; G05B 19/00
(52) U.S. Cl. ................ 705/20; 340/5.91; 235/383
(58) Field of Search ............ 705/20; 235/383; 340/5.9, 5.91

(56) References Cited

U.S. PATENT DOCUMENTS

| | | | | |
|---|---|---|---|---|
| 5,461,561 A | * | 10/1995 | Ackerman et al. | 705/28 |
| 5,671,362 A | * | 9/1997 | Cowe et al. | 705/28 |
| 5,794,211 A | | 8/1998 | Goodwin, III et al. | 705/23 |
| 5,854,475 A | * | 12/1998 | Goodwin, III et al. | 235/383 |
| 5,907,143 A | * | 5/1999 | Goodwin, III | 235/383 |
| 5,930,771 A | * | 7/1999 | Stapp | 705/28 |
| 5,988,498 A | * | 11/1999 | Hoell | 235/383 |
| 6,021,395 A | * | 2/2000 | Goodwin, III et al. | 705/20 |
| 6,073,843 A | * | 6/2000 | Goodwin, III et al. | 235/383 |
| 6,243,690 B1 | * | 6/2002 | Adamec et al. | 705/20 |
| 6,469,617 B1 | * | 10/2002 | Goodwin, III et al. | 340/5.91 |
| 2002/0004750 A1 | * | 1/2002 | Zimmerman et al. | 705/20 |
| 2002/0065726 A1 | * | 5/2002 | Bhyravabhotla | 705/20 |
| 2002/0065789 A1 | * | 5/2002 | Witt | 705/400 |

FOREIGN PATENT DOCUMENTS

| | | | | |
|---|---|---|---|---|
| EP | 0 276 816 | * | 8/1988 | 705/20 |
| JP | 404098495 A | * | 3/1992 | 705/20 |

* cited by examiner

Primary Examiner—Robert P. Olszewski
Assistant Examiner—Andrew Joseph Rudy
(74) Attorney, Agent, or Firm—Priest & Goldstein, PLLC

(57) ABSTRACT

A system and method are disclosed for using an enhanced external data interface to display data in electronic price label (EPL) systems. The enhanced external data interface (EDI) responds to various stimuli or requests, such as a store manager or other user logged onto a computer terminal in real time, computer-generated applications and timed file data. The enhanced EDI may receive messages to store first information in, or to read first information already stored in, an EPL data file. The EDI determines whether it is time to update a message displayed by a particular EPL or group thereof for a particular merchandise item. If it is time to update the message, the EDI compares information read from the EPL data file with information about the same merchandise item stored in a message management file. If the two pieces of information are different from one another, the EDI causes a message to be transmitted to the EPL, containing the information from the message management file and a command to display such information.

6 Claims, 3 Drawing Sheets

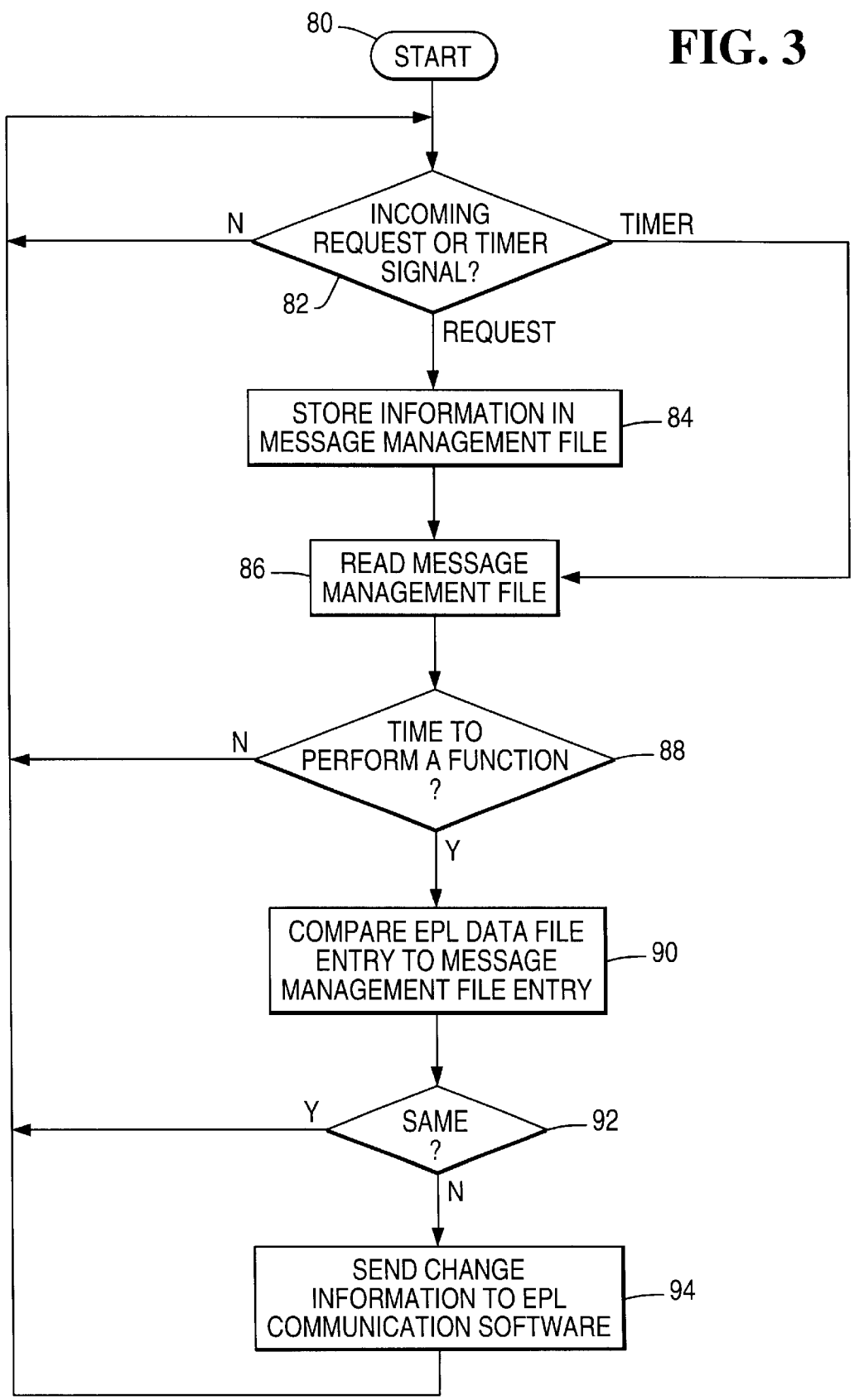

SYSTEM AND METHOD FOR USING AN ENHANCED EXTERNAL DATA INTERFACE TO DISPLAY DATA IN EPL SYSTEMS

FIELD OF THE INVENTION

The present invention relates to electronic price label (EPL) systems, and more specifically to a system and method for using an enhanced external data interface to display data in EPL systems.

BACKGROUND OF THE INVENTION

Point-of-sale (POS) transaction processing systems typically include a price look-up (PLU) file which contains item identification information and item price information.

EPL systems typically include a plurality of EPLs for merchandise items in a store. EPLs display the price of corresponding merchandise items on store shelves and are typically attached to a rail along the leading edge of the shelves. A store may contain thousands of EPLs to display the prices of the merchandise items. The EPLs are coupled, through a cable or wireless signal connection, to a central server from where information about the EPLs is typically maintained in an EPL data file. Price information displayed by the EPLs is obtained from the PLU file.

To keep the cost of EPLs to a minimum, current EPLs include a limited amount of memory, and typically are used by retailers to display minimal information, such as regular (retail) price and price per unit. However, retailers wish to display ever increasing amounts of alternate information (i.e., other than regular price and unit price). Depending on the retail environment, it may be particularly desirable to display such alternate information as the amount of Value Added Tax (VAT), a "frequent shopper" discounted price, the price in a different currency, product restriction information (for example, restrictions on the sale of alcoholic beverages), government program information (for example, the food stamp program and the women with infant children (WIC) program), or other promotional information applicable to a certain merchandise item.

A commonly assigned and co-pending application, entitled "System and Method for Handling Alternate Information on Electronic Price Labels," which is hereby incorporated by reference in its entirety, provides for the display of alternate information in lieu of the usual unit price information. In practice, this is accomplished utilizing an external data interface (EDI) in an approach sometimes referred to as "message indexing." In message indexing, a PLU reader systematically reads through a PLU file, which contains an entry identifying each merchandise item, its regular price and, optionally, a special code or index which indicates that alternate information is to be displayed for the item. The PLU reader then systematically reads through another file, known as a message definition file or EDI configuration file, which contains a list associating each of the codes or indices with a specific text message. For each code or index identified in the PLU file and then associated with a text message in the EDI configuration file, the EPL computer generates and broadcasts the corresponding message to be displayed by the applicable EPL.

Message indexing thus may entail a laborious search of the entire PLU file to determine the presence or absence of an alternate message index for every item of merchandise in the store, coupled with a laborious search of the entire EDI configuration file to find and broadcast the associated text messages. Message indexing does not provide a convenient means for selectively and immediately initiating or changing an alternate message to be displayed on only certain EPLs, for example, those corresponding to a single merchandise item.

Therefore, it would be desirable to provide a system and method for an enhanced external data interface (EDI) to facilitate selective and immediate initiation or change of an alternate message to be displayed on a particular EPL or group thereof.

SUMMARY OF THE INVENTION

In accordance with the teachings of the present invention, a computerized system and method for using an enhanced external data interface to display data in EPL systems is provided. The enhanced EDI responds to various stimuli or requests, such as a store manager or other user logged onto a computer terminal in real time. Other stimuli would include computer-generated applications and timed file data.

According to one aspect of the present invention, the system may suitably include a computer having an external data interface adapted to provide information to be displayed by an electronic price label, comprising:

means for receiving a message to store first information in, or to read first information already stored in, a first data file;

means for storing said first information in the first data file;

means for reading the first information stored in the first data file;

means for determining whether it is time to update a message displayed by a particular electronic price label or group thereof for a particular merchandise item;

means for comparing the first information read from the first data file with second information about the same merchandise item stored in a second data file; and means for transmitting a message to the electronic price label, containing the second information and a command to display the second information.

The method for using an enhanced external data interface to display data in electronic price label systems includes the steps of:

receiving a message to store first information in, or to read first information already stored in, a first data file;

if the message is to store information, storing said first information in the first data file;

reading the first information stored in the first data file;

determining whether it is time to update a message displayed by a particular electronic price label or group thereof for a particular merchandise item;

if it is time to update the message, comparing the first information read from the first data file with second information about the same merchandise item stored in a second data file; and if the second information is different from the first information, transmitting a message to the electronic price label, containing the second information and a command to display the second information.

It is accordingly an object of the present invention to provide a system and method for using an enhanced external data interface to display data specific to a particular EPL or group thereof, at the precise time such data is needed.

It is another object of the present invention to provide a system and method for an enhanced EDI which preserves information previously displayed by a particular EPL or group thereof, and facilitates the re-display of such information following the display of a different, interim message.

It is a further object of the present invention to provide a system and method for an enhanced EDI which conserves system bandwidth.

A more complete understanding of the present invention, as well as other features, objects and advantages of the invention, will be apparent from the following detailed description and the accompanying drawings.

BRIEF DESCRIPTION OF THE DRAWINGS

FIG. 3 is a flow diagram illustrating a method of using an enhanced external data interface.

DETAILED DESCRIPTION OF THE PREFERRED EMBODIMENT

Figure 1:
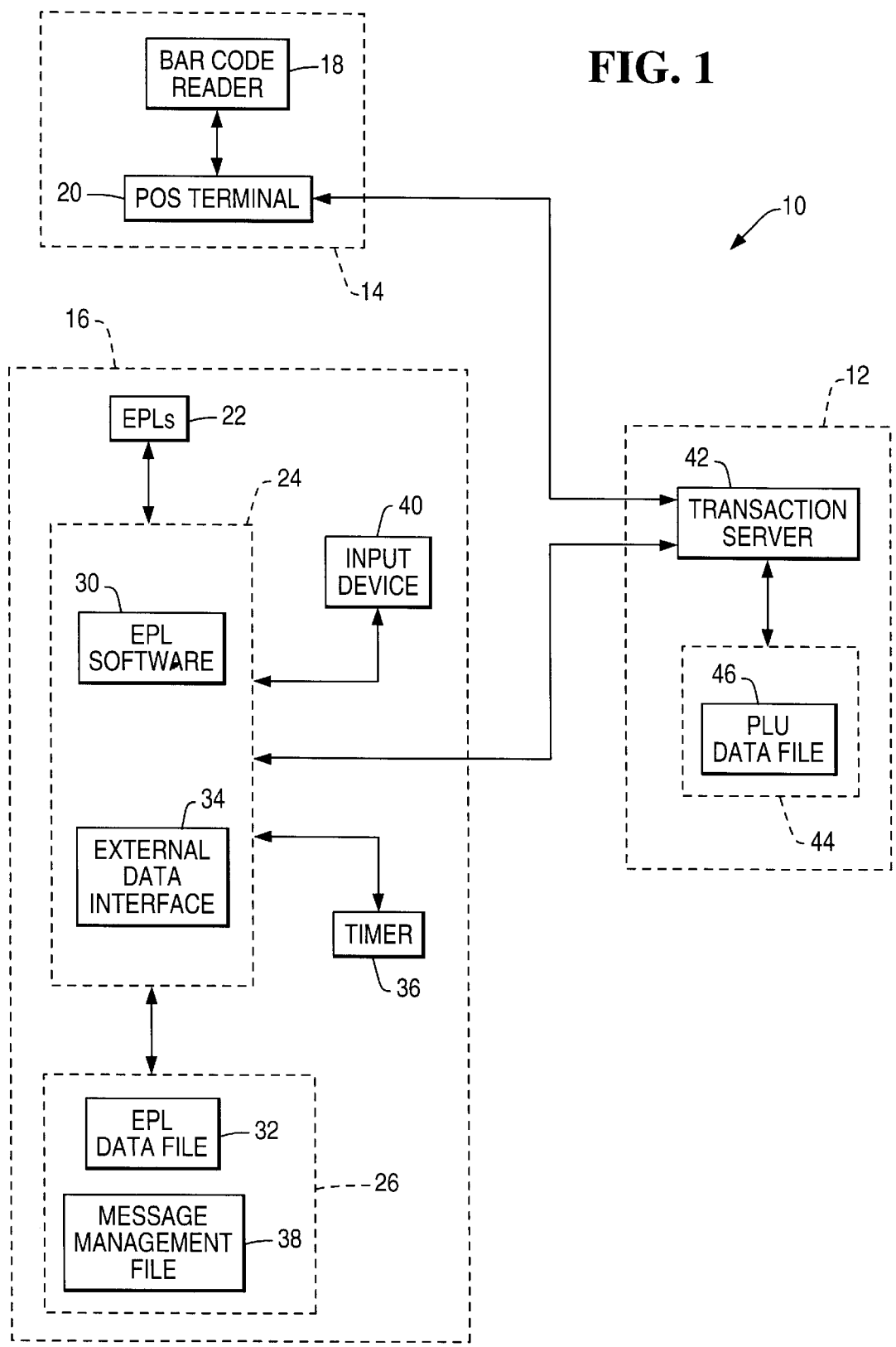
FIG. 1 is a block diagram of a transaction processing system.

Referring now to FIG. 1, transaction system 10 primarily includes host computer system 12, point-of-sale (POS) system 14, and EPL system 16. Here, components 12 and 14 are shown as separate components that are networked together, but they may also form a single component. Thus, host computer system 12 may be a POS terminal which doubles as a host computer for a network of other POS terminals.

POS system 14 includes bar code reader 18 and POS terminal 20.

EPL system 16 primarily includes EPLs 22, host EPL computer 24, and EPL storage medium 26.

Host EPL computer 24 executes EPL software 30. To assist with execution of certain tasks performed by EPL software 30, EPL computer 24 may include a built-in time keeping device, commonly referred to as a system clock, which is synchronized with current time, in order to automatically execute the tasks at their scheduled times.

EPL communication software 30 is responsible for scheduling and transmitting price data to EPLs 22. EPL software 30 obtains prices in PLU data file 46 as these are entered in input device 40 (immediate processing) or after these have been stored within price look-up (PLU) data file 46 (batch processing).

EPL computer 24 also executes external data interface (EDI) 34. EDI 34 records operator-entered display information and instructions and allows the operator to create messages to EPLs 22. EDI 34 also processes information from any computer-based application that is designed to create messages for EPLs 22. EDI 34 also may be signaled by timer circuits 36 to read information from message management file 38, containing previously stored messages for EPLs 22, and to compare such information with that stored in EPL data file 32. EDI 34 passes messages to EPL software 30 for scheduling and transmission.

EPL storage medium 26 stores EPL data file 32 and message management file 38. EPL storage medium 26 is preferably a fixed disk drive.

EPL data file 32 contains EPL identification and price checksum information. Price checksum information is calculated from price information in PLU data file 46. EPL data file 32 contains current information displayed by EPLs 22.

Message management file 38 includes a table wherein each entry is identified, preferably by the serial number of an individual EPL or by the universal product code (UPC) for a particular item of merchandise, which may correspond to a single EPL or a group thereof. For each entry, message information is provided and, optionally, the date & time for the particular message display to begin and end.

The contents of EPL data file 32 and message management file 38 may be placed in any number of files instead of two files.

Input device 40 is preferably a keyboard.

Host computer system 12 includes PLU storage medium 44 and transaction server 42.

Transaction server 42 handles price requests from POS terminal 20. POS terminal 20 sends item identification information to transaction server 42 and transaction server 42 returns the corresponding price from PLU data file 46.

PLU storage medium 44 stores PLU data file 46. PLU data file 46 is available for distribution to POS terminal 20. Provision may be made for direct access to PLU data file 46 by bar code reader 18.

Figure 2:
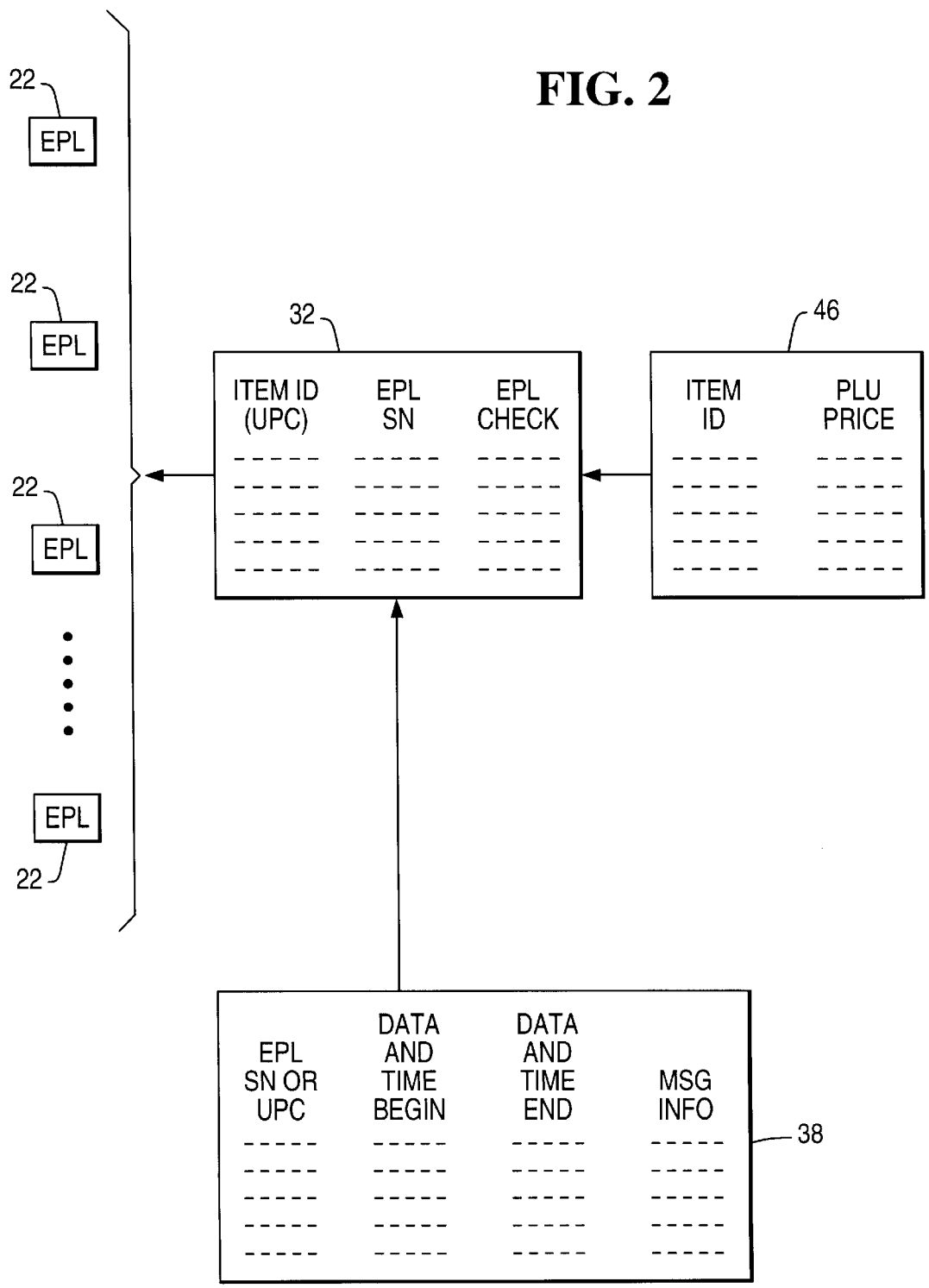
FIG. 2 is a diagram showing data files used within a transaction establishment.

Turning now to FIG. 2, EPL data file 32, message management file 38, and PLU data file 46 are shown in more detail.

EPL data file 32 includes a line entry for each EPL 22 in EPL system 16. Each line entry has an item identification entry (ITEM ID (UPC)), an EPL identification entry (EPL SN), and an EPL price checksum value entry (EPL CHECK).

Entry ITEM ID (UPC) identifies a store item, preferably by its UPC. Entry EPL SN identifies the serial number of each EPL assigned to the item. Entry EPL CHECK is a checksum value of the digits of the price information that is displayed by EPL 22.

Message management file 38 includes a separate record for each EPL serial number or item UPC. Each record contains message information (MSG Info) for the particular EPL or merchandise item and, optionally, the respective dates and times for the particular message display to begin (Date & Time Begin) and end (Date & Time End).

PLU data file 46 includes a line entry for each item sold in the transaction establishment. Each line entry has at least an item identification entry (ITEM ID), preferably the item's UPC, as well as a PLU price entry (PLU PRICE).

The following example represents one aspect of the normal operation of the system shown in FIGS. 1 and 2. A user may provide the following information to EDI 34, via input device 40, with respect to a particular merchandise item:

SAVE .40 from 1/27/98 until 3/1/98
GREAT /// GIFT from 2/10/98 until 2/15/98.

EDI 34 will cause this information to be stored in message management file 38. When signaled by timer 36 on 1/27/98, EDI 34 will compare the information in message management file 38 (SAVE .40) with the information in EPL data file 32 (reflecting the message, if any, presently displayed on EPLs) for this merchandise item. If the compared information is not the same, EDI 34 will communicate the "SAVE .40" message to EPL software 30 which, in turn, causes this new message to be broadcast to the applicable EPLs. Then, when signaled by timer 36 on 2/10/98, EDI 34 will compare the information in message management file 38 (GREAT /// GIFT) with the information for this item in EPL data file 32 (SAVE .40). EDI 34 then will communicate the "GREAT /// GIFT" message to EPL software 30 which, in turn, causes this new message to be broadcast to the applicable EPLs, replacing the "SAVE .40" message. By a similar process on 2/15/98, EDI 34 will be signaled by timer 36 and will cause the "SAVE .40" message to be restored, replacing the "GREAT /// GIFT" message. The "SAVE .40" message will continue to be displayed by the applicable EPLs until 3/1/98. At that time, EDI 34 once again will be signaled by timer 36 and, by a similar process, will cause the "SAVE .40" message to be replaced with a default message (e.g., the item's unit price) on the applicable EPLs. In this fashion, the user conveniently can provide for a special promotional message for the merchandise item for approximately five weeks of January and February, to be temporarily replaced with yet another special promotional message for Valentine's Day.

Turning now to FIG. 3, a method for using an enhanced external data interface to display data in EPL systems begins with START 80.

In step 82, EDI 34 "sleeps" and waits for a message either in the form of a request generated by a human operator or by a computer-generated application, or in the form of a signal from timer 36. If EDI 34 receives a timer signal, operation proceeds to step 86. If EDI 34 receives a request, operation proceeds to step 84.

In step 84, EDI 34 causes the information in the request to be stored in message management file 38.

In step 86, EDI 34 reads the information stored in message management file 38.

In step 88, EDI 34 compares the information from message management file 38 with information from timer 36, to determine whether it is time to perform a function, that is, to update the message displayed by a particular EPL or group thereof. If it is not time to perform a function, operation returns to step 82 to wait for another message. If it is time to perform a function, operation proceeds to step 90.

In step 90, EDI 34 compares the message information in EPL data file 32 for an item with the information in message management file 38 for the same item.

In step 92, EDI 34 determines whether the two pieces of information compared in step 90 are the same. If these are the same, operation returns to step 82 to wait for another message. If these are not the same, operation proceeds to step 94.

In step 94, EDI 34 sends the message information from message management file 38 to EPL communication software 30, to be broadcast to the target EPL(s) 22. EPL software 30 also updates EPL data file 32 with the information broadcast to, and now being displayed by, target EPL(s) 22.

After step 94 is completed, operation returns to step 82 to "sleep" and wait for another message.

It should be noted that steps 90 and 92 are optional, but are included in a preferred embodiment to limit the number of messages that need to be broadcast to the EPLs, thereby conserving system bandwidth.

Although the present invention has been described with particular reference to certain preferred embodiments thereof, variations and modifications of the present invention can be effected within the spirit and scope of the following claims.

We claim:

1. A computerized method for using an enhanced external data interface to display data in an electronic price label (EPL) system, comprising the steps of:
   (a) receiving a message to store first information in, or to read first information already stored in, an EPL data file;
   (b) if the message is to store information, storing said first information in the EPL data file;
   (c) reading the first information stored in the EPL data file, said first information including a message presently displayed by an EPL or a group of EPLs displaying a same message;
   (d) determining whether it is time to update the message displayed by the EPL or the group of EPLs for a particular merchandise item by comparing timer information with information from a message management file;
   (e) if it is time to update the message, comparing the first information read from the EPL data file with second information about the same merchandise item stored in the message management file, said second information including a new message to be displayed by the EPL; and
   (f) if the second information is different from the first information, transmitting a message to the electronic price label, containing the second information and a command to display the second information.

2. The method of claim 1 wherein the message to store first information is a timer signal.

3. The method of claim 1 wherein the message to read first stored information is received directly from an operator or from a computer-generated application.

4. A computerized method for using an enhanced external data interface to display data in an electronic price label (EPL) system, comprising the steps of:
   (a) receiving a message to store first information in, or to read first information already stored in, an EPL data file;
   (b) if the message is to store information, storing said first information in the EPL data file;
   (c) reading the first information stored in the EPL data file, said first information including a message presently displayed by an EPL or group of EPLs displaying a same message;
   (d) determining whether it is time to update the message displayed by the EPL or the group of EPLs for a particular merchandise item by comparing timer information with information from a message management file; and
   (e) if it is time to update the message, transmitting a message to the EPL, containing second information about the same merchandise item, read from a second data file, and a command to display the second information, said second information including a message to be displayed by the EPL.

5. A computerized system having an external data interface adapted to provide information to be displayed by an electronic price label (EPL), comprising:
   means for receiving a message to store first information in, or to read first information already stored in, an EPL data file; means for storing said first information in the EPL data file; means for reading the first information stored in the EPL data file, said first information including a message presently displayed by the EPL; means for determining whether it is time to update the message displayed by the EPL for a particular merchandise item by comparing timer information with information from a message management file; means for comparing the first information read from the EPL data file with second information about the same merchandise item stored in the message management file, said second information including a new message to be displayed by the EPL; and means for transmitting a message to the electronic price label, containing the second information and a command to display the second information.

6. A computerized method for using an enhanced external data interface to display data in an electronic price label system, comprising the steps of:

(a) receiving a message to store first information in, or to read first information already stored in, a first data file;

(b) if the message is to store information, storing said first information in the first data file;

(c) reading the first information stored in the first data file;

(d) determining whether it is time to update a message displayed by a particular electronic price label or group thereof for a particular merchandise item;

(e) if it is time to update the message, comparing the first information read from the first data file with second information about the same merchandise item stored in a second data file; and (f) if the second information is different from the first information, transmitting a message to the electronic price label, containing the second information and a command to display the second information;

wherein the first data file is an electronic price label data file;

wherein the second data file is a message management file; and wherein step (d) comprises comparing information from the message management file with information from a timer.

* * * * *